US012628954B2

(12) United States Patent
Wang

(10) Patent No.: US 12,628,954 B2
(45) Date of Patent: May 19, 2026

(54) FOLDING CHAIR

(71) Applicant: Dongguan Shichang Metals Factory Ltd., Dongguan City (CN)

(72) Inventor: Yumin Wang, Dongguan City (CN)

(73) Assignee: Dongguan Shichang Metals Factory Ltd. (CN)

( * ) Notice: Subject to any disclaimer, the term of this patent is extended or adjusted under 35 U.S.C. 154(b) by 119 days.

(21) Appl. No.: 18/820,399

(22) Filed: Aug. 30, 2024

(65) Prior Publication Data

US 2026/0020675 A1 Jan. 22, 2026

(30) Foreign Application Priority Data

Jul. 19, 2024 (CN) .......................... 202410977993.1

(51) Int. Cl.
| | |
|---|---|
| *A47C 4/20* | (2006.01) |
| *A47C 4/24* | (2006.01) |
| *A47C 4/48* | (2006.01) |
| *F16B 13/08* | (2006.01) |
| *F16B 31/02* | (2006.01) |
| *F16B 39/10* | (2006.01) |

(52) U.S. Cl.
CPC .................. *A47C 4/20* (2013.01); *A47C 4/24* (2013.01); *A47C 4/48* (2013.01); *F16B 13/0875* (2013.01); *F16B 31/028* (2013.01); *F16B 39/103* (2013.01)

(58) Field of Classification Search
CPC .... A47C 4/20; A47C 4/24; A47C 4/38; A47C 4/48; A47C 4/14; F16B 39/103; F16B 39/105; F16B 39/108; F16B 39/14; F16B 39/24; F16B 39/26; F16B 39/10; F16B 13/0875; F16B 1/18; F16B 31/028; F16B 33/004
See application file for complete search history.

(56) References Cited

U.S. PATENT DOCUMENTS

| | | | | |
|---|---|---|---|---|
| 753,686 | A | * | 3/1904 | Duren ..................... F16B 39/10 411/99 |
| 1,122,901 | A | * | 12/1914 | Gary ...................... F16B 39/10 411/191 |
| 2,552,883 | A | | 5/1951 | Cable |

(Continued)

FOREIGN PATENT DOCUMENTS

| | | |
|---|---|---|
| CN | 201208075 | 3/2009 |
| CN | 101396209 A | 4/2009 |

(Continued)

OTHER PUBLICATIONS

Li'Na Yu, State Intellectual Property Office of the P.R. China; International Search Report , PCT/CN2018/081590, Date of Mailing Jun. 27, 2018, China.

(Continued)

*Primary Examiner* — Syed A Islam
(74) *Attorney, Agent, or Firm* — Luedeka Neely, P.C.

(57) ABSTRACT

A folding chair is disclosed, which includes a front leg tube, a rear leg tube, a backrest and a seat. The front leg tube is linked with the rear leg tube through connection pieces. The backrest is arranged on the front leg tube. One or more washers are arranged on the front leg tube and/or the rear leg tube. The length of an edge of a curved bottom of the one or more washers is not greater than 50% of the perimeter of the front leg tube or the rear leg tube.

19 Claims, 11 Drawing Sheets

330

(56) References Cited

U.S. PATENT DOCUMENTS

| | | | |
|---|---|---|---|
| 3,041,092 A | | 6/1962 | Eves et al. |
| 3,220,764 A | | 11/1965 | Duer |
| 6,193,307 B1 * | | 2/2001 | Lin .......................... A47C 4/24 |
| | | | 297/58 |
| 7,967,374 B2 | | 6/2011 | Akkad |
| 8,231,171 B2 | | 7/2012 | Leng |
| 8,678,700 B2 | | 3/2014 | Tsai |
| 8,870,278 B2 | | 10/2014 | Tsai |
| 8,919,872 B2 * | | 12/2014 | Tsai .......................... A47C 4/20 |
| | | | 108/118 |
| 9,719,281 B2 | | 8/2017 | Tsai |
| 10,064,491 B2 | | 9/2018 | Piretti |
| 10,681,985 B2 * | | 6/2020 | Lin .......................... A47C 7/24 |
| 2014/0105672 A1 | | 4/2014 | Tsai |

FOREIGN PATENT DOCUMENTS

| | | | |
|---|---|---|---|
| CN | 101623153 A | 1/2010 |
| CN | 201734253 U | 2/2011 |
| CN | 201929438 U | 8/2011 |
| CN | 203692981 U | 7/2014 |
| CN | 205548049 U | 9/2016 |
| WO | 2010051665 A1 | 5/2010 |

OTHER PUBLICATIONS

UK Intellectual Property Office, Search Report for Application No. GB2500330.2, dated Jun. 23, 2025.

* cited by examiner

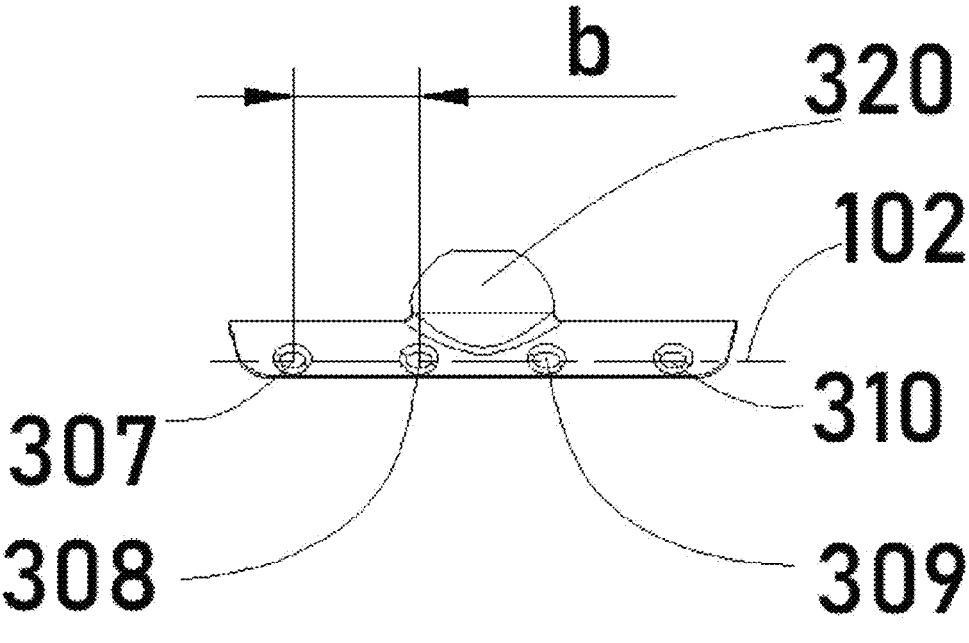
FIG. 7
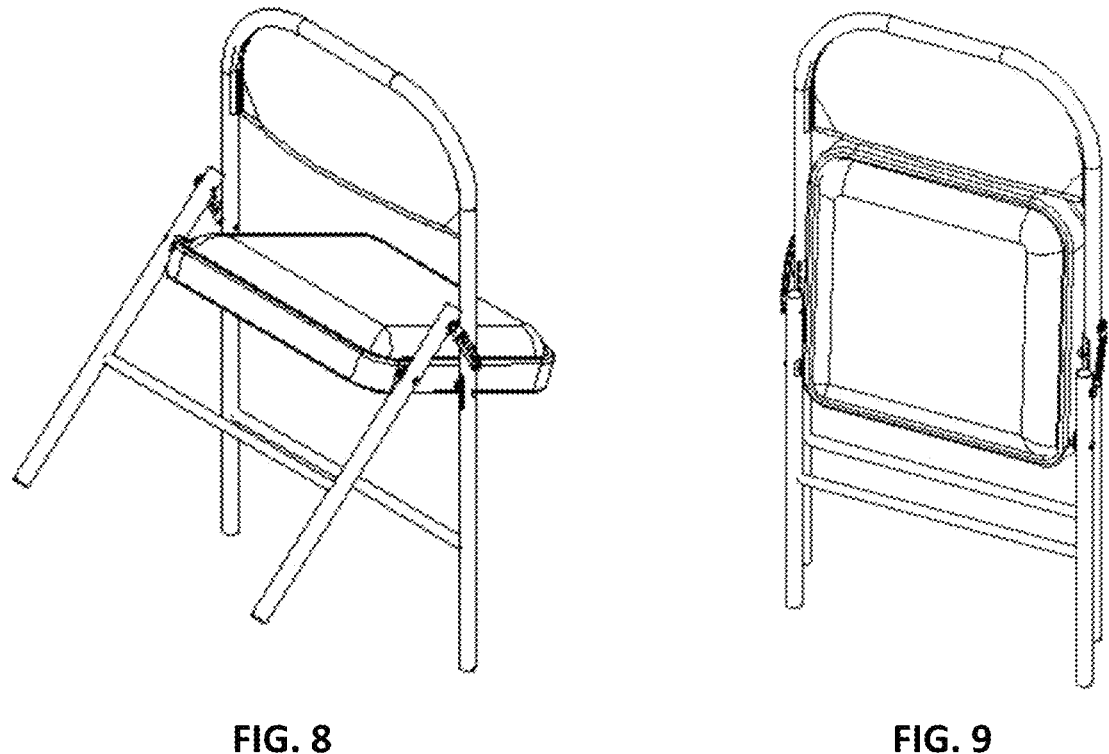
FIG. 8                    FIG. 9

C

D

FOLDING CHAIR

CROSS-REFERENCE TO RELATED APPLICATION

The present application claims priority to Chinese patent application No. 202410977993.1, filed Jul. 19, 2024, the content of which is incorporated herein by reference in its entirety.

TECHNICAL FIELD

The present disclosure relates to furniture, in particular to a folding chair.

BACKGROUND

A related folding chair includes a front leg tube, a rear leg tube, a seat, a backrest and a plurality of washers. The washers are universal parts. A bottom edge of a washer is directly fixed on a leg tube which is connected to a plate of the seat by a rivet penetrating through both the washer and the leg tube.

In the related folding chair, paint at a joint between the washer and the leg tube and at adjacent place is easy to fall off, so the leg tube is easy to rust, and the joint between the washer and the leg tube is easy to pinch hands. Moreover, an impact test strength of the folding chair is low because of a weak connection between the washer and the leg tube. Therefore, it is necessary to design a new type of folding chair which can improve a connection strength between the washer and the leg tube, prevent a hand from being pinched, and prevent the paint from falling off.

SUMMARY

A folding chair with a novel washer is provided in the present disclosure.

According to embodiments of the present disclosure, a folding chair is disclosed, which includes a front leg tube, a rear leg tube, a backrest and a seat, the front leg tube and the rear leg tube being linked through connection pieces, the backrest being arranged on the front leg tube, at least one washer is arranged on at least one of the front leg tube and the rear leg tube respectively, wherein a length of an edge of a curved bottom of the at least one washer is not greater than 50% of a perimeter of one of the front leg tube and the rear leg tube.

In an embodiment, the at least one washer has a plurality of recesses with uniform specifications, and the plurality of recesses include a first recess, a second recess, a third recess, a fourth recess, a fifth recess, a sixth recess, a seventh recess, an eighth recess, a ninth recess, and a tenth recess. The first recess, the second recess, the third recess, the fourth recess, the fifth recess and the sixth recess are located at a front side of the at least one washer, and the centers of circles of the first recess, the second recess, the third recess, the fourth recess, the fifth recess and the sixth recess are on a first axis. The seventh recess, the eighth recess, the ninth recess and the tenth recess are located at a rear side of the at least one washer, and centers of circles of the seventh recess, the eighth recess, the ninth recess and the tenth recess are on a second axis.

In an embodiment, the first axis and the second axis form an included angle Q, and a range of the included angle Q is 120° to 180°.

In an embodiment, a diameter of each of the plurality of recesses of the at least one washer is D, and D is 3 mm to 5 mm.

In an embodiment, a depth of each of the plurality of recesses of the at least one washer is H, and His 1 mm to 2 mm.

In an embodiment, six recesses consisting of the first recess, the second recess, the third recess, the fourth recess, the fifth recess and the sixth recess of the at least one washer are equidistantly or not equidistantly distributed on the first axis, a distance between any two adjacent recesses of the six recesses is "a", and "a" is 5 mm to 14 mm.

In an embodiment, four recesses consisting of the seventh recess, the eighth recess, the ninth recess and the tenth recess of the at least one washer are equidistantly or not equidistantly distributed on the second axis, a distance between any two adjacent recesses of the four recesses is "b", and "b" is 13 mm to 25 mm.

In an embodiment, a drain hole is provided at a junction of a front side and a rear side of the at least one washer, and the drain hole is configured to discharge liquid staying on the at least one washer in time.

In an embodiment, an included angle between the front leg tube and ground is 58.5° to 61.5°, and an included angle between the front leg tube and the rear leg tube is 41.5° to 44.5°.

In an embodiment, the at least one washer has a diversion trench, and the diversion trench is capable of diverting liquid existing in the at least one washer.

Further applications will be obvious from descriptions herein. It should be understood that the descriptions and specific examples are for illustrative purposes only and are not intended to limit a scope of the present disclosure.

BRIEF DESCRIPTION OF DRAWINGS

The drawings described herein are for illustration purposes only and are not intended to limit a scope of the present disclosure in any way.

FIG. 7 is a further illustration of FIG. 4 with respect to the washer;

FIG. 8 is an assembly diagram of the folding chair which is fully unfolded;

FIG. 9 is an assembly diagram of the folding chair which is fully folded;

DETAILED DESCRIPTION

The following detailed description illustrates principles of the present disclosure by way of example rather than limitation. This specification will clearly enable those of ordinary skill in the art to make and use the present disclosure, and describes several embodiments, modifications, variations, substitutions and uses of the present disclosure, including what is currently considered as a best mode for carrying out the present disclosure. It should be understood that the drawings are schematic representations of exemplary embodiments of the present disclosure, and do not limit the present disclosure, nor are they necessarily drawn to scale. The following description is merely exemplary and is not intended to limit the disclosure.

When a component, element or layer is referred to as being "on", "engaged to", "connected to" or "coupled to" another component, element or layer, it may be directly on, engaged to, connected to or coupled to another component, element or layer, or intervening components or layers may be present. Conversely, when an element is referred to as being directly on, directly engaged to, directly connected to, or directly coupled to another element or layer, there may be intervening elements or layers. Other words used to describe a relationship between elements should be interpreted in a similar way, such as "between" versus "directly between", "adjacent" versus "directly adjacent" and so on. As used herein, terms "and/or" and "one or two" include any and all combinations of one or more associated listed items.

Figure 2:
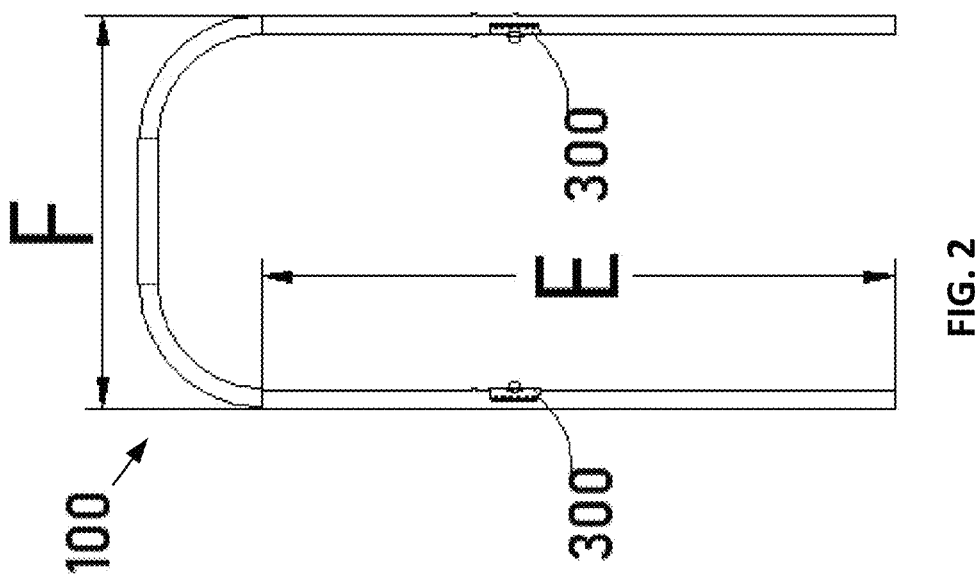
FIG. 2 is an assembly diagram with a washer on a front leg tube.
Figure 1:
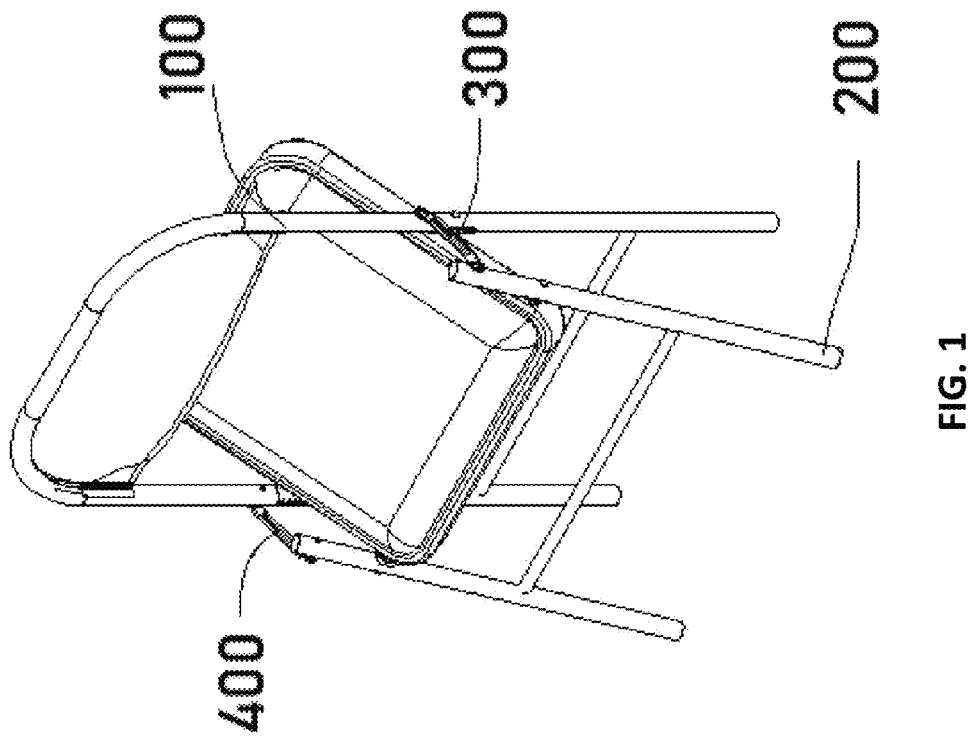
FIG. 1 is an assembly diagram of a folding chair.
Figure 5:
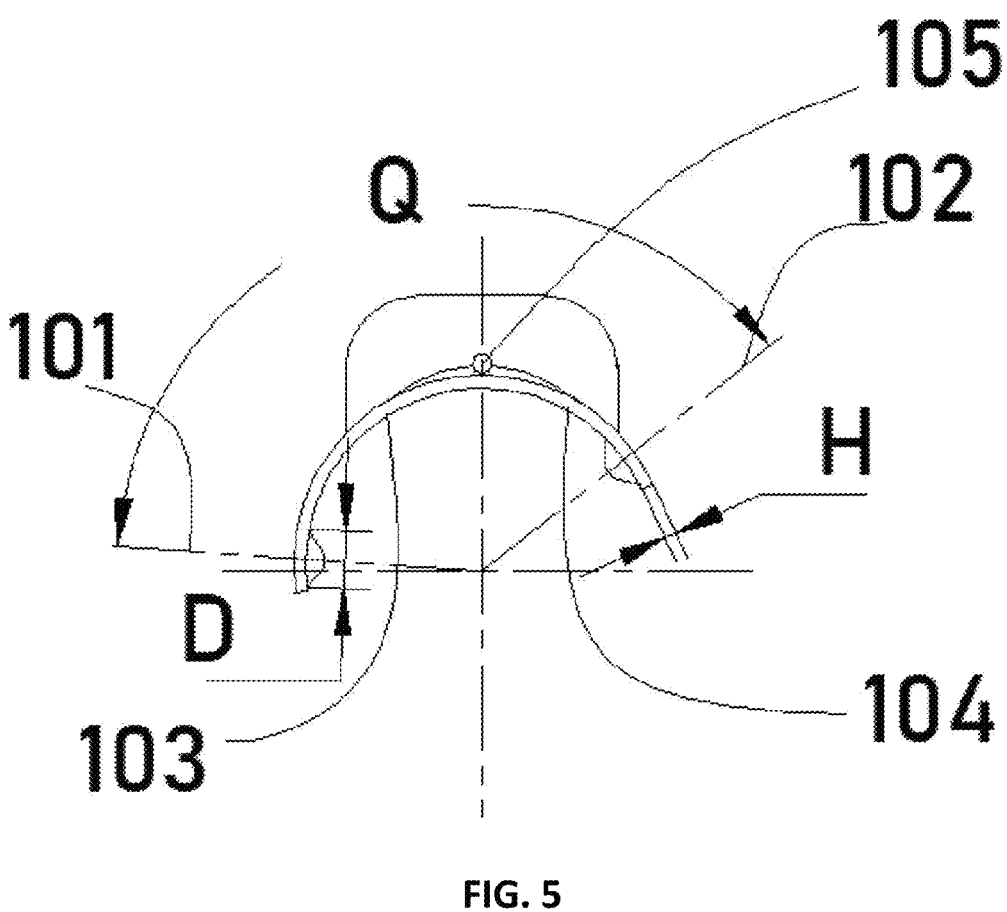
FIG. 5 is a side view of the washer.

As shown in FIGS. 1, 2 and 5, a folding chair includes a front leg tube 100, a rear leg tube 200, a backrest and a seat. The front leg tube 100 is linked with the rear leg tube 200 through connection pieces 400. The backrest is arranged on the front leg tube 100. One or more washers 300 are arranged on the front leg tube 100 and/or the rear leg tube 200. A length of an edge of a curved bottom of the washers 300 is not greater than 50% of a perimeter of a connecting leg tube. Because the length of the edge of the curved bottom of the washers 300 is not greater than 50% of the perimeter of the connecting leg tube, when assembling the washers 300 with the front leg tube 100, the washers 300 are capable of being directly attached to the front leg tube 100 without being bent. When the length of the edge of the curved bottom of the washers 300 is greater than 50% of the perimeter of the connecting leg tube, when assembling the washers 300 with the front leg tube 100, the washers 300 are required to be bent, which directly affects an initial stress distribution of the washers 300. Moreover, when the length of the edge of the curved bottom of the washers 300 is greater than 50% of the perimeter of the connecting leg tube, a selection of the front leg tube 100 is directly affected, that is, a diameter of the front leg tube 100 is limited by the washers 300. Instead, when the length of the edge of the curved bottom of the washers 300 is not greater than 50% of the perimeter of the connecting leg tube, the diameter of the front leg tube 100 can be selected in a relatively large range. When the diameter of the front leg tube 100 is larger, a wall of the front leg tube 100 is correspondingly increased, and an overall strength of the front leg tube 100 is further improved, which is also beneficial to strengthening an overall strength of the folding chair.

With continued reference to FIG. 2, each of the washers 300 is located in a middle portion of a respective elongated section of the front leg tube 100. The front leg tube 100 includes elongated sections and a bend section. A length of each elongated section is E and a length of the bend section is F. The length E is preferably twice the length F. The middle portion of the elongated section is located between one half and one third of the length E. The washers 300 located in the middle portion of the elongated section of the front leg tube 100 directly improves an overall stress of the front leg tube 100, thus directly improving the overall strength of the front leg tube 100.

Figure 3:
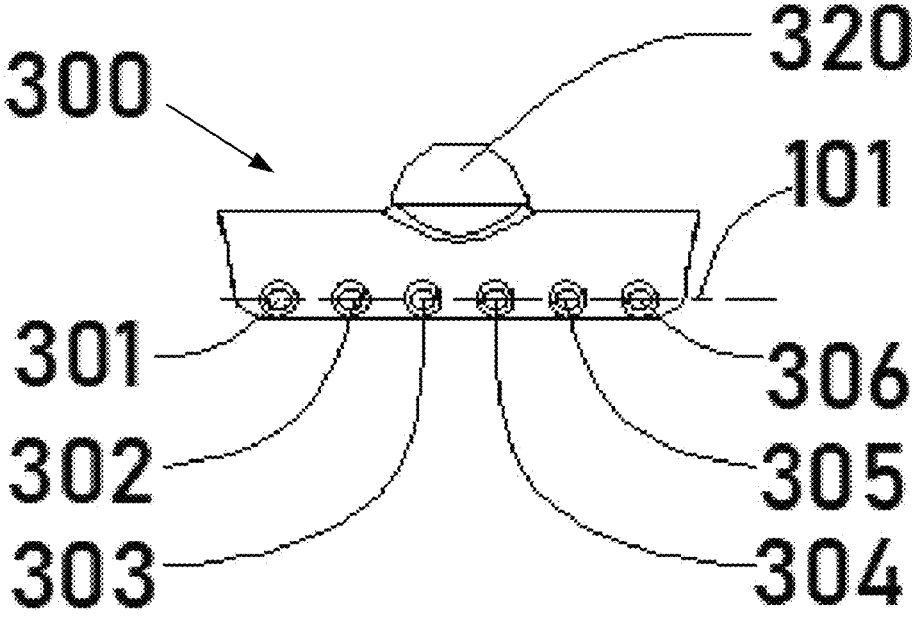
FIG. 3 is a front view of the washer.

FIG. 3 shows a front side of one of the washers 300, and the front side is indicated by reference number 103. Each washer 300 has a plurality of recesses with uniform specifications, which are a first recess 301, a second recess 302, a third recess 303, a fourth recess 304, a fifth recess 305, a sixth recess 306, a seventh recess 307, an eighth recess 308, a ninth recess 309 and a tenth recess 310, respectively. The first recess 301, the second recess 302, the third recess 303, the fourth recess 304, the fifth recess 305 and the sixth recess 306 are located at the front side 103 of the washer 300, and centers of circles of six recesses consisting of the first recess 301, the second recess 302, the third recess 303, the fourth recess 304, the fifth recess 305 and the sixth recess are on a first axis 101. Since the six recesses are on the same axis, namely the first axis 101, a force on the front side is uniformly distributed, and the force is not concentrated on a certain recess, but is uniformly on the six recesses. The six recesses are configured to implement bonding, joining, welding, connecting or other processes thereon, which can improve a stress strength of the recesses, so that the overall strength of the washers 300 can be improved. Moreover, existences of these recesses can prevent paint on the washers 300 from falling off and the washers 300 from rusting. When the paint starts to fall off from a certain position, the six recesses distributed equidistantly or not equidistantly can prevent the paint from falling off in a large area and prolong service life of the paint.

Figure 4:
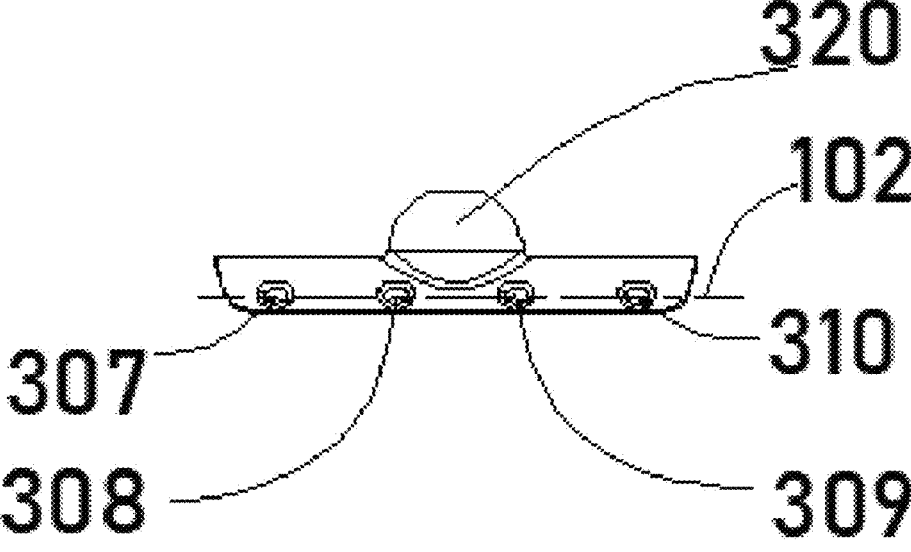
FIG. 4 is a back view of the washer.

FIG. 4 shows a rear side of one of the washers 300, and the rear side is indicated by reference numeral 104. Each of the washers 300 has a plurality of recesses with uniform specifications, which are a first recess 301, a second recess 302, a third recess 303, a fourth recess 304, a fifth recess 305, a sixth recess 306, a seventh recess 307, an eighth recess 308, a ninth recess 309 and a tenth recess 310, respectively. The seventh recess 307, the eighth recess 308, the ninth recess 309 and the tenth recess 310 are located at the rear side 104 of the washer 300, and centers of circles of four recesses consisting of the seventh recess 307, the eighth recess 308, the ninth recess 309 and the tenth recess 310 are on a second axis 102. Since the four recesses are on a same axis, namely the second axis 102, a force on the rear side is uniformly distributed, and the force is not concentrated on a certain recess, but is uniformly on the four recesses. Therefore, the front side 103 and the rear side 104 of the washers 300 distribute the stress on a respective one of the first axis 101 and the second axis 102, thus enhancing the overall strength of the washers 300. The four recesses are configured to implement bonding, joining, welding, connecting or other processes thereon, which can improve the overall strength of the washers 300. Moreover, existences of these recesses can prevent the paint on the washer from falling off and the washer from rusting. When the paint starts to fall off from a certain position, the four recesses distributed equidistantly or not equidistantly can prevent the paint from falling off in a large area and prolong the service life of the paint.

FIG. 5 shows a side view of one of the washers 300. The first axis 101 and the second axis 102 form an included angle of Q, of which a range is preferably 120° to 180°. The angle Q is not greater than 180°, so that when assembling the washers 300 with the front leg tube 100, the washers 300 are capable of being directly attached to the front leg tube 100 without being bent. Moreover, this angle is convenient for mounting and dismounting the washers 300 on the front leg tube 100, without sacrificing the service life of the washers 300. The washers 300 can be repeatedly mounted and dismounted without deformation (before the washers 300 are completely fixed to a leg tube), thus it is convenient to adjust a relative position between the washers 300 and a leg tube when assembling. With continued reference to FIG. 5, a diameter of each of the recesses of the washers 300 is D, which is preferably 3 mm to 5 mm. A depth of each of the recesses is H, which is preferably 1 mm to 2 mm. The diameter of the each of the recesses of the washers 300 is close to a size of a human finger, therefore when a finger touches these recesses to unfold or fold the folding chair, the finger falls into one of the recesses, and recessed spaces of these recesses are suitable to accommodate a part of the finger on a certain one of these recesses, so that the finger is not easy to be pinched in a cross fit of the front leg tube 100 and the rear leg tube 200, and even if the finger is pinched, the recessed spaces of the recesses provide a proper buffer, preventing severe pinching. On a longitudinal axis, a drain hole 105 is provided at a junction of the front side 103 and the rear side 104 of the washers 300. The drain hole 105 is configured to discharge liquid staying on the washers 300 in time, which can speed up an outflow of chemical liquid, thereby reducing a risk of corrosion, prolonging the service life of the washers 300, and further improving a performance of the folding chair as a whole.

Figure 6:
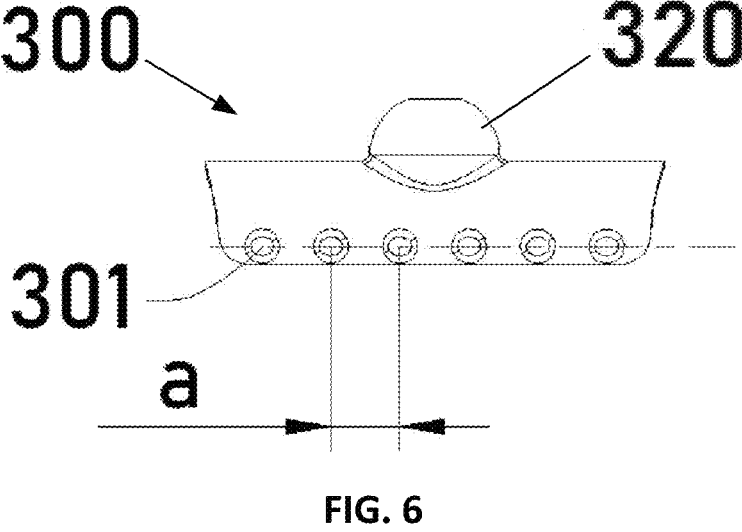
FIG. 6 is a further illustration of FIG. 3 with respect to the washer.

FIG. 6 is a further illustration of FIG. 4. The first recess 301, the second recess 302, the third recess 303, the fourth recess 304, the fifth recess 305 and the sixth recess 306 of the washers 300 are equidistantly distributed on the first axis 101, and a distance between any two adjacent recesses is "a", which is preferably 5 mm to 14 mm. As shown in FIG. 6, a convex part 320 is provided. When the folding chair is folded or unfolded, the convex part 320 can provide enough space between the front leg tube 100 and the rear leg tube 200 to protect a user's fingers from being pinched, and cooperate with the recessed spaces of the recesses mentioned above, so that the whole folding chair can protect the user's fingers well during use.

FIG. 7 is a further illustration of FIG. 5. The seventh recess 307, the eighth recess 308, the ninth recess 309 and the tenth recess 310 of the washers 300 are equidistantly distributed on the second axis 102, and a distance between any two adjacent recesses is "b", which is preferably 13 mm to 25 mm. Since the distances "a" and "b" are preferably not identical, any one of the recesses at the front side 103 is incapable of being coaxial with any one of the recesses at the rear side 104, and a center axis of any one of the recesses at the front side 103 is incapable of intersecting with a center axis of any one of the recesses at the rear side 104. Center axes of the six recesses at the front side and center axes of the four recesses at the rear side are neither intersecting nor co-planar. Therefore, an overall stress distribution of the washers 300 is more uniform, and the overall strength of the washers 300 is further improved.

FIG. 8 is an assembly diagram of the folding chair which is fully unfolded. An included angle between the front leg tube 100 and ground is preferably 58.5° to 61.5°. An included angle between the front leg tube 100 and the rear leg tube 200 is preferably 41.5° to 44.5°. The included angle between the front leg tube 100 and the ground is preferably 58.5° to 61.5°, and close to 60°. When the included angle between the front leg tube 100 and the ground is 58.5° to 61.5°, the folding chair is more stable in an unfolded state.

FIG. 9 is an assembly diagram of the folding chair which is fully folded.

Figure 10:
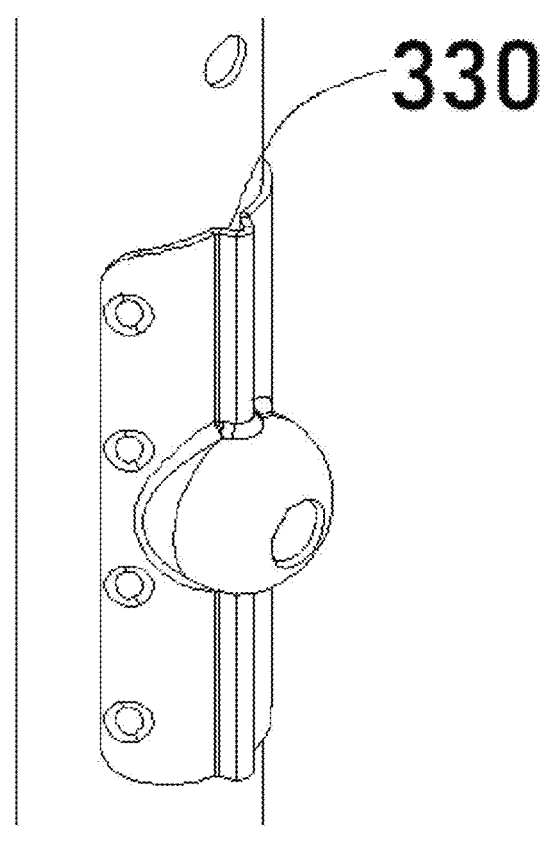
FIG. 10 is a partial enlarged view of an engagement of the washer with a diversion trench and a leg tube.
Figure 11:
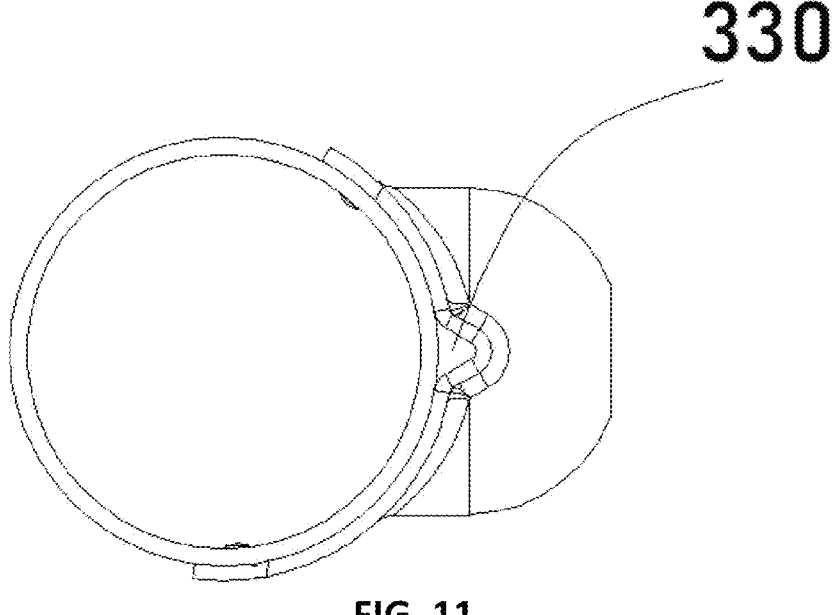
FIG. 11 is a plan view of the washer 300 with the diversion trench.

Referring to FIGS. 10 and 11, the washers 300 have a diversion trench 330, which is capable of diverting liquid existing in the washers 300 to reduce a corrosion of the washers 300 caused by the liquid. Moreover, the diversion trench 330 can enhance the stress strength of the washers 300. It is required to clean a frame of the folding chair before painting, and relevant chemical liquids are required to be applied in the cleaning process, and the chemical liquids are diverted through the diversion trench 330 as soon as possible to avoid an unnecessary corrosion of the washers 300. The washers 300 have the diversion trench 330, which extends in a longitudinal direction of the washers 300, so that the overall strength of the washers 300 is enhanced, and the diversion trench 330 plays a role of a reinforcing rib.

Figure 12:
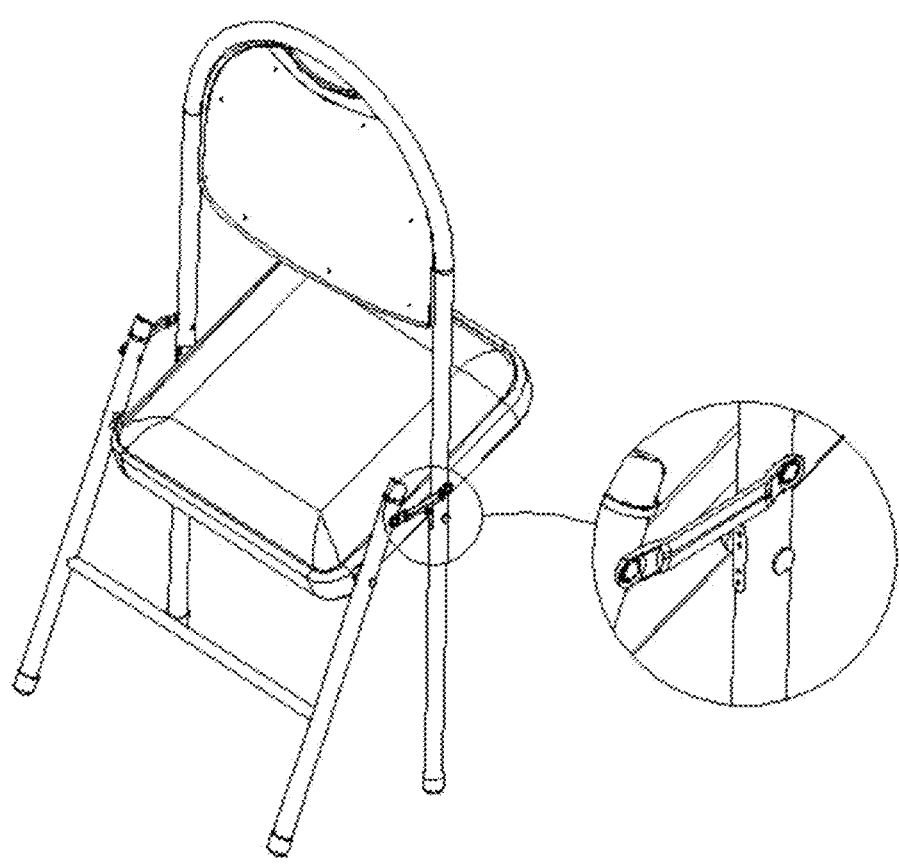
FIG. 12 is an assembly diagram of another embodiment of the folding chair, in which a partial enlarged view of the engagement of the washer and the leg tube is shown.
Figure 13:
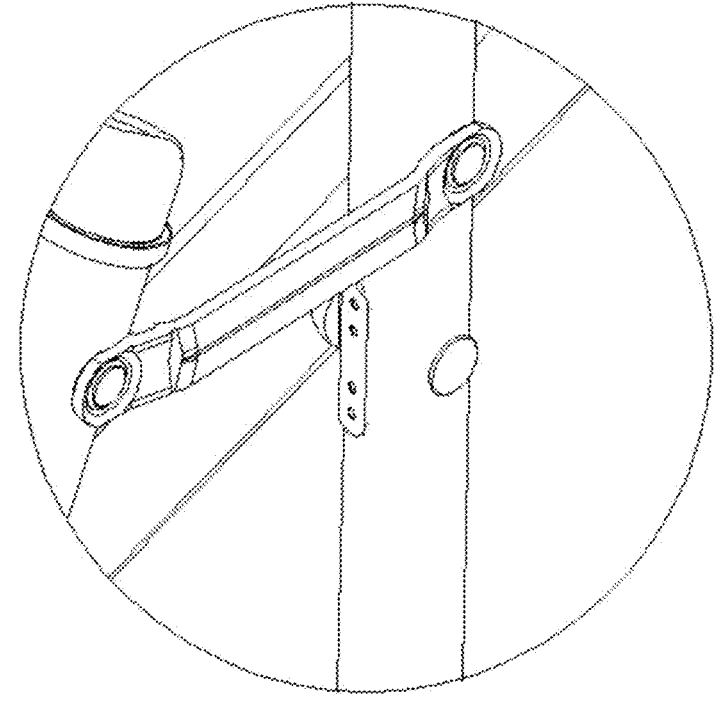
FIG. 13 is a partial enlarged view of the engagement of the washer and the leg tube shown in FIG. 12.
Figure 14:
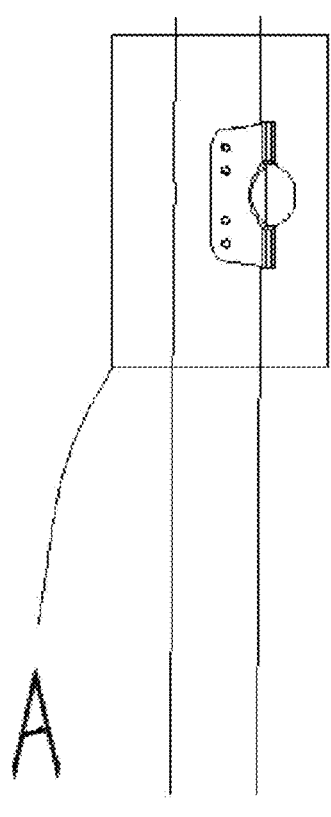
FIG. 14 is a partial view of the engagement between the washer and an A-type leg tube.
Figure 15:
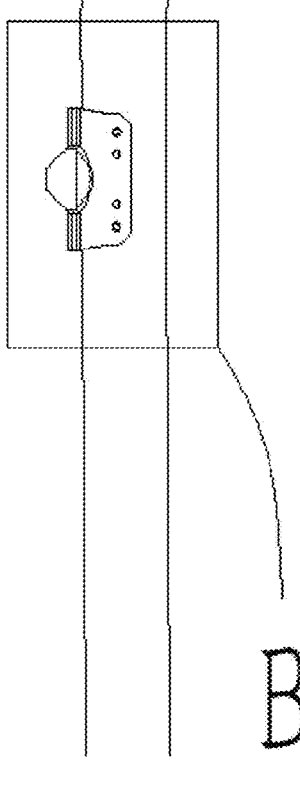
FIG. 15 is a partial view of a B-type engagement between the washer and the leg tube.
Figure 16:
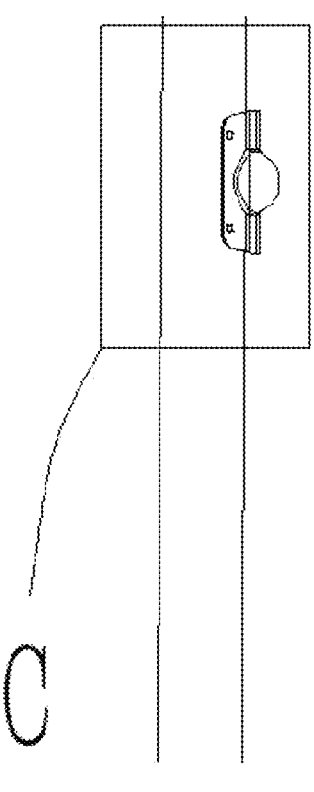
FIG. 16 is a partial view of a C-type engagement between the washer and the leg tube.
Figure 17:
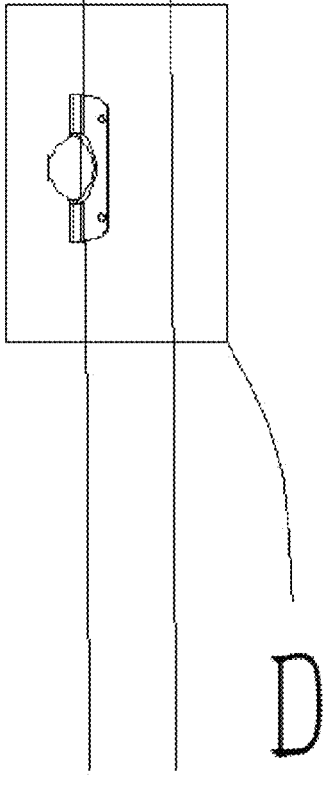
FIG. 17 is a partial view of a D-type engagement between the washer and the leg tube.
Figure 18:
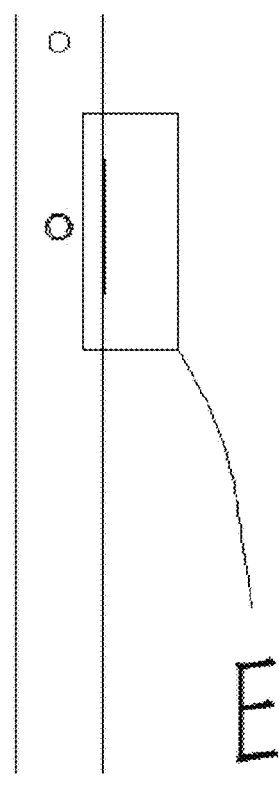
FIG. 18 is a partial view of an E-type engagement between the washer and the leg tube.
Figure 19:
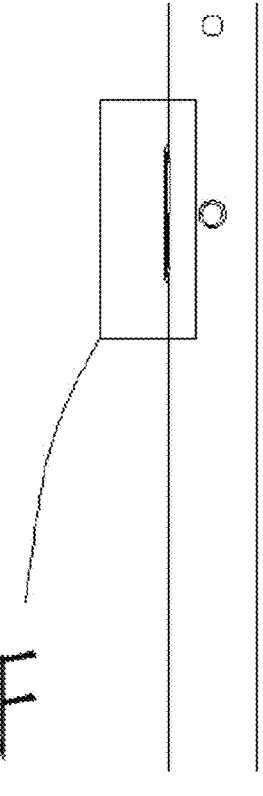
FIG. 19 is a partial view of an F-type engagement between the washer and the leg tube.
Figure 20:
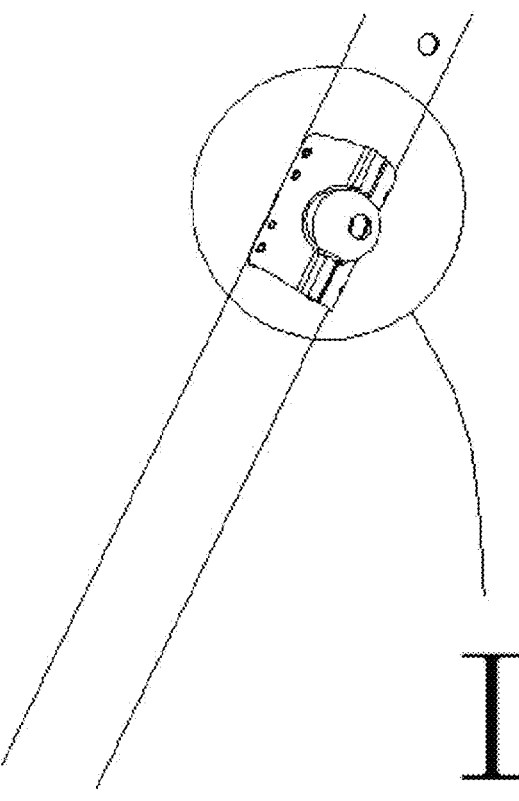
FIG. 20 is a partial view of an I-type engagement between the washer and the leg tube.
Figure 21:
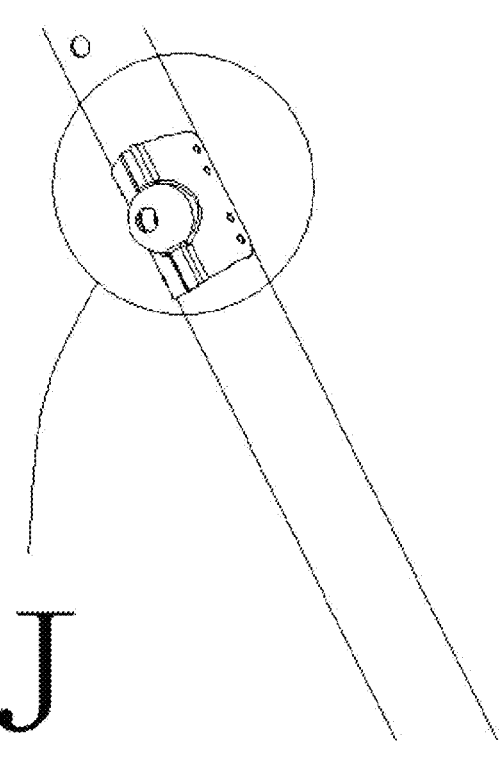
FIG. 21 is a partial view of a J-type engagement between the washer and the leg tube.
Figure 22:
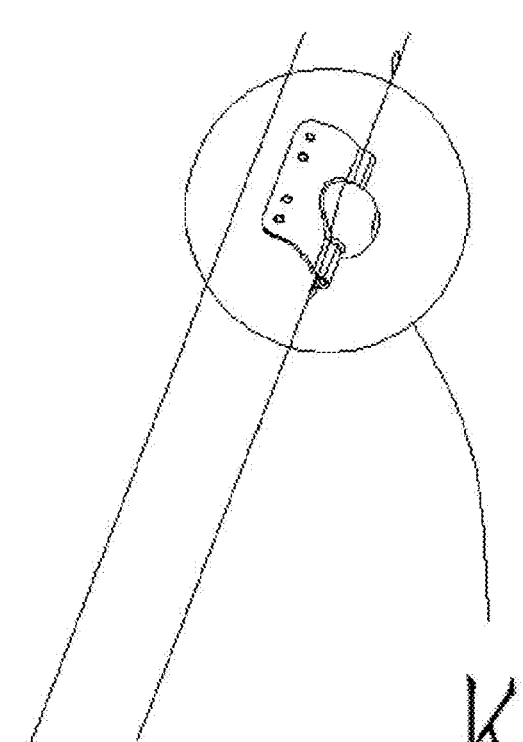
FIG. 22 is a partial view of a K-type engagement between the washer and the leg tube.
Figure 23:
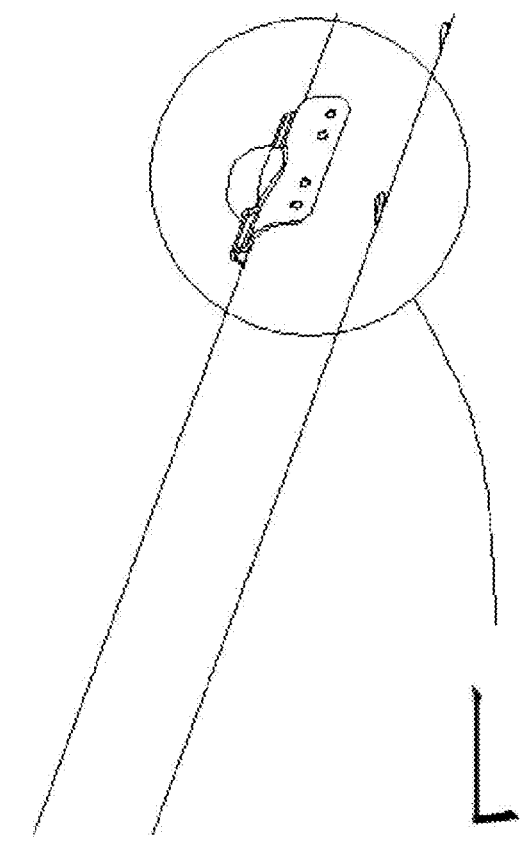
FIG. 23 is a partial view of an L-type engagement between the washer and the leg tube.

FIGS. 12 and 13 are assembly diagrams of another embodiment of the folding chair, in which a partial enlarged view of an engagement between a washer and a leg tube is shown.

FIGS. 14 to 23 are assembly diagrams of another embodiment of the folding chair, in which partial enlarged views of a plurality of embodiments of the engagement between a washer and a leg tube are shown.

The description of this disclosure is merely exemplary, and variations that do not depart from the gist of this disclosure are intended to fall within the scope of this disclosure. These variations should not be regarded as a departure from the scope of this disclosure.

Words used to indicate an orientation or a direction should not be regarded as limiting. Therefore, words such as front, rear, side, upper, lower, top, bottom, forward, backward, close, far, inside and outside and synonyms, antonyms, and derivative word thereof are used merely for a convenient description, unless otherwise there is a specific explanation in the context. One or more inventors may provide exemplary embodiments of different claim subject matters in any particular way, and the claim subject matters are intended to include these ways.

Alternative embodiments of the present disclosure can also be widely included in parts, elements and features referred to or quoted herein, in any or all combinations of two or more of the parts, the elements or the features, and specific integration mentioned herein is equivalent to what is known in the field to which the present disclosure relates, and these known equivalents are deemed to be incorporated herein as if individually listed.

In the description of the present disclosure, several means one or more, and a plurality of means more than two. Greater than, less than, more than, etc. are understood as excluding a number referred. Above, below, and within are understood as including a number referred to. If the first, second, third, fourth, fifth, sixth, seventh, eighth, ninth and tenth are described only for a purpose of distinguishing technical features, they cannot be understood as indicating or implying relative importance or implicitly indicating the number of indicated technical features or implicitly indicating the sequence of indicated technical features. Eleventh, twelfth, Nth, etc. can be set according to actual needs.

What is claimed is:

1. A folding chair, comprising a front leg tube, a rear leg tube, a backrest, and a seat, wherein the front leg tube and the rear leg tube are linked through connection pieces, and the backrest is arranged on the front leg tube, wherein at least one washer is arranged on at least one of the front leg tube and the rear leg tube, and wherein a length of an edge of a curved bottom of the at least one washer is not greater than 50% of a perimeter of at least one of the front leg tube and the rear leg tube, and further wherein:

the at least one washer comprises a plurality of recesses with uniform specifications, wherein each of the plurality of recesses is configured for use in joining the at least one washer to the front leg tube or the rear leg tube.

2. The folding chair of claim 1 wherein:

the plurality of recesses comprise a first recess, a second recess, a third recess, a fourth recess, a fifth recess, a sixth recess, a seventh recess, an eighth recess, a ninth recess, and a tenth recess;

the first recess, the second recess, the third recess, the fourth recess, the fifth recess and the sixth recess are located at a front side of the at least one washer;

centers of circles of the first recess, the second recess, the third recess, the fourth recess, the fifth recess and the sixth recess are on a first axis;

the seventh recess, the eighth recess, the ninth recess and the tenth recess are located at a rear side of the at least one washer; and centers of circles of the seventh recess, the eighth recess, the ninth recess and the tenth recess are on a second axis.

3. The folding chair of claim 2, wherein the first axis and the second axis form an included angle Q having a range of 120° to 180°.

4. The folding chair of claim 1, wherein a diameter D of each of the plurality of recesses of the at least one washer ranges from 3 mm to 5 mm.

5. The folding chair of claim 1, wherein a depth H of each of the plurality of recesses of the at least one washer ranges from 1 mm to 2 mm.

6. The folding chair of claim 2, wherein six recesses consisting of the first recess, the second recess, the third recess, the fourth recess, the fifth recess and the sixth recess of the at least one washer are equidistantly or not equidistantly distributed on the first axis, and a distance "a" between any two adjacent recesses of the six recesses ranges from 5 mm to 14 mm.

7. The folding chair of claim 2, wherein four recesses consisting of the seventh recess, the eighth recess, the ninth recess and the tenth recess of the at least one washer are equidistantly or not equidistantly distributed on the second axis, a distance between any two adjacent recesses of the four recesses is b, and b is 13 mm to 25 mm.

8. The folding chair of claim 1, wherein a drain hole is provided at a junction of a front side and a rear side of the at least one washer, and the drain hole is configured to discharge liquid staying on the at least one washer.

9. The folding chair of claim 1, wherein an included angle between the front leg tube and ground ranges from 58.5° to 61.5°, and an included angle between the front leg tube and the rear leg tube ranges from 41.5° to 44.5°.

10. The folding chair of claim 1, wherein the at least one washer has a diversion trench that is capable of diverting liquid existing in the at least one washer.

11. The folding chair of claim 1, wherein each of the plurality of recesses is configured to retain paint therein to prevent peeling of the paint from the washer.

12. The folding chair of claim 1, wherein each of the plurality of recesses is configured to implement welding of the at least one washer to the front leg tube or the rear leg tube.

13. A folding chair, comprising:

a front leg tube;

a rear leg tube linked to the front leg tube through connection pieces;

a backrest attached to the front leg tube;

a seat attached to the front leg tube and the rear leg tube; and at least one washer attached to the front leg tube or the rear leg tube, the at least one washer having a front side and a rear side, the at least one washer comprising:

a first plurality of recesses with uniform specifications disposed adjacent the front side of the at least one washer, the first plurality of recesses configured for use in joining the front side of the washer to the front or rear leg tube;

a second plurality of recesses with uniform specifications disposed adjacent the rear side of the at least one washer, the second plurality of recesses configured for use in joining the second side of the washer to the front or rear leg tube; and a convex part disposed between the front and rear sides of the washer.

14. The folding chair of claim 13, wherein each of the first plurality of recesses and second plurality of recesses is configured to retain paint therein to prevent peeling of the paint from the washer.

15. The folding chair of claim 13, wherein each of the first plurality of recesses and second plurality of recesses is configured to implement welding of the at least one washer to the front leg tube or the rear leg tube.

16. The folding chair of claim 13, wherein the first plurality of recesses comprise six recesses and the second plurality of recesses comprise four recesses.

17. The folding chair of claim 13, wherein the first plurality of recesses comprise two recesses and second plurality of recesses comprise two recesses.

18. The folding chair of claim 13, wherein the convex part of the at least one washer is disposed between the front leg tube and the seat.

19. The folding chair of claim 13, wherein the convex part of the at least one washer is disposed between the rear leg tube and the seat.

* * * * *